(12) United States Patent
Chen

(10) Patent No.: US 6,662,697 B1
(45) Date of Patent: Dec. 16, 2003

(54) CIRCULAR SAW HAVING A SAW ARM ANGLE ADJUSTING DEVICE

(75) Inventor: Ruey-Zon Chen, Dali (TW)

(73) Assignee: Rexon Co., Ltd., Taichung Hsien (TW)

( * ) Notice: Subject to any disclaimer, the term of this patent is extended or adjusted under 35 U.S.C. 154(b) by 5 days.

(21) Appl. No.: 10/153,783

(22) Filed: May 24, 2002

(51) Int. Cl.[7] .............................................. B23D 45/04
(52) U.S. Cl. .......................... 83/471.3; 83/473; 83/490
(58) Field of Search ................................ 83/471.3, 473, 83/490, 581

(56) References Cited

U.S. PATENT DOCUMENTS 2,844,173 A * 7/1958 Gaskell ..................... 83/477.1
5,040,444 A * 8/1991 Shiotani et al. ................ 83/473
2003/0024365 A1 * 2/2003 Chang ........................ 83/471.3
2003/0110914 A1 * 6/2003 Brazell et al. ............. 83/471.3

* cited by examiner

Primary Examiner—Kenneth E. Peterson
(74) Attorney, Agent, or Firm—Rosenberg, Klein & Lee

(57) ABSTRACT

A circular saw having a saw arm angle adjusting device includes a rotation shaft mounted between the base and the saw arm, and an adjusting device mounted on the base for adjusting the angle of the saw arm, so that the saw arm may be pivoted through an angle and may be positioned. The adjusting device includes a drive shaft, a drive unit, a driven unit, and an adjusting unit. Thus, the user may directly operate the drive shaft, so as to operate the adjusting device for adjusting the angle of the saw arm relative to the base so that the user may adjust the angle of the saw arm easily and conveniently.

5 Claims, 6 Drawing Sheets

US 6,662,697 B1

CIRCULAR SAW HAVING A SAW ARM ANGLE ADJUSTING DEVICE

BACKGROUND OF THE INVENTION

1. Field of the Invention

The present invention relates to a circular saw having a saw arm angle adjusting device, and more particularly to a circular saw having a saw arm angle adjusting device, wherein the user may directly operate the drive shaft, so as to operate the adjusting device for adjusting the angle of the saw arm relative to the base so that the user may adjust the angle of the saw arm easily and conveniently.

2. Description of the Related Art

A conventional circular saw in accordance with the prior art comprises a base, a saw arm mounted on the base, and a saw blade mounted on the saw arm. The saw arm may be moved toward the base for cutting the workpiece on the base by the rotating saw blade. The conventional circular saw also comprises an adjusting device for adjusting the angle of the saw arm relative to the base, so that the saw arm is inclined with the base. Thus, the cutting face of the workpiece may be cut to have an inclined shape. The adjusting device is usually mounted on the rear portion of the saw arm, so that the user has to move to the rear portion of the saw arm, to operate the adjusting device, thereby causing inconvenience to the user. In addition, the adjusting device may provide a larger angle adjusting function, and cannot be used to micro-adjust the angle of the saw arm relative to the base.

SUMMARY OF THE INVENTION

The present invention has arisen to mitigate and/or obviate the disadvantage of the conventional adjusting device of the circular saw.

The primary objective of the present invention is to provide a circular saw having a saw arm angle adjusting device, wherein the distal end of the drive shaft is exposed outward from the bottom face of the base to face the user, so that the user may directly operate the drive shaft without having to move, so as to operate the adjusting device for adjusting the angle of the saw arm relative to the base so that the user may adjust the angle of the saw arm easily and conveniently.

Another objective of the present invention is to provide a circular saw having a saw arm angle adjusting device, wherein the gear portion of the driven unit having a smaller tooth number may be used to drive the first gear of the adjusting unit having a greater tooth number, and the second gear of the adjusting unit having a smaller tooth number may be used to drive the gear portion of the rotation shaft having a greater tooth number, thereby saving manual energy, and thereby capable of micro-adjusting the angle of the saw arm relative to the base.

In accordance with the present invention, there is provided a circular saw having a saw arm angle adjusting device, comprising a base, a saw arm, a rotation shaft mounted between the base and the saw arm, and an adjusting device mounted on the base for adjusting the angle of the saw arm, so that the saw arm may be pivoted through an angle, and may be positioned, wherein:

the rotation shaft is provided with a gear portion, and a fixing bolt is extended through the rotation shaft, and has one end provided with a fixing nut for fixing the rotation shaft to prevent rotation of the rotation shaft; and the adjusting device includes:

a drive shaft, movable axially;

a drive unit, secured on one end of the drive shaft to move therewith, and having a first side formed with a first locking recess, and a second side formed with a second locking recess, for receiving and locking the fixing nut of the fixing bolt when the drive unit is moved to abut the fixing nut of the fixing bolt;

a driven unit, rotatably mounted on the base, the driven unit having one end provided with a locking block that may be inserted into the first locking recess of the drive unit when the drive unit is moved to abut the locking block of the driven unit, the driven unit having an outer wall provided with a gear portion; and an adjusting unit, including a shaft rotatably mounted on the base, a first gear secured on a first end of the shaft and meshing with the gear portion of the driven unit, and a second gear secured on a second end of the shaft and meshing with the gear portion of the rotation shaft.

Preferably, the gear portion of the driven unit has a tooth number smaller than that of the first gear of the adjusting unit.

Preferably, the second gear of the adjusting unit has a tooth number smaller than that of the gear portion of the rotation shaft.

Preferably, the first side of the drive unit is formed with a receiving hole for receiving and securing the drive shaft, so that the drive unit may be moved with the drive shaft.

Preferably, the driven unit has an inner wall formed with a through hole for passage of the drive shaft.

Further benefits and advantages of the present invention will become apparent after a careful reading of the detailed description with appropriate reference to the accompanying drawings.

DETAILED DESCRIPTION OF THE INVENTION

Figure 1:
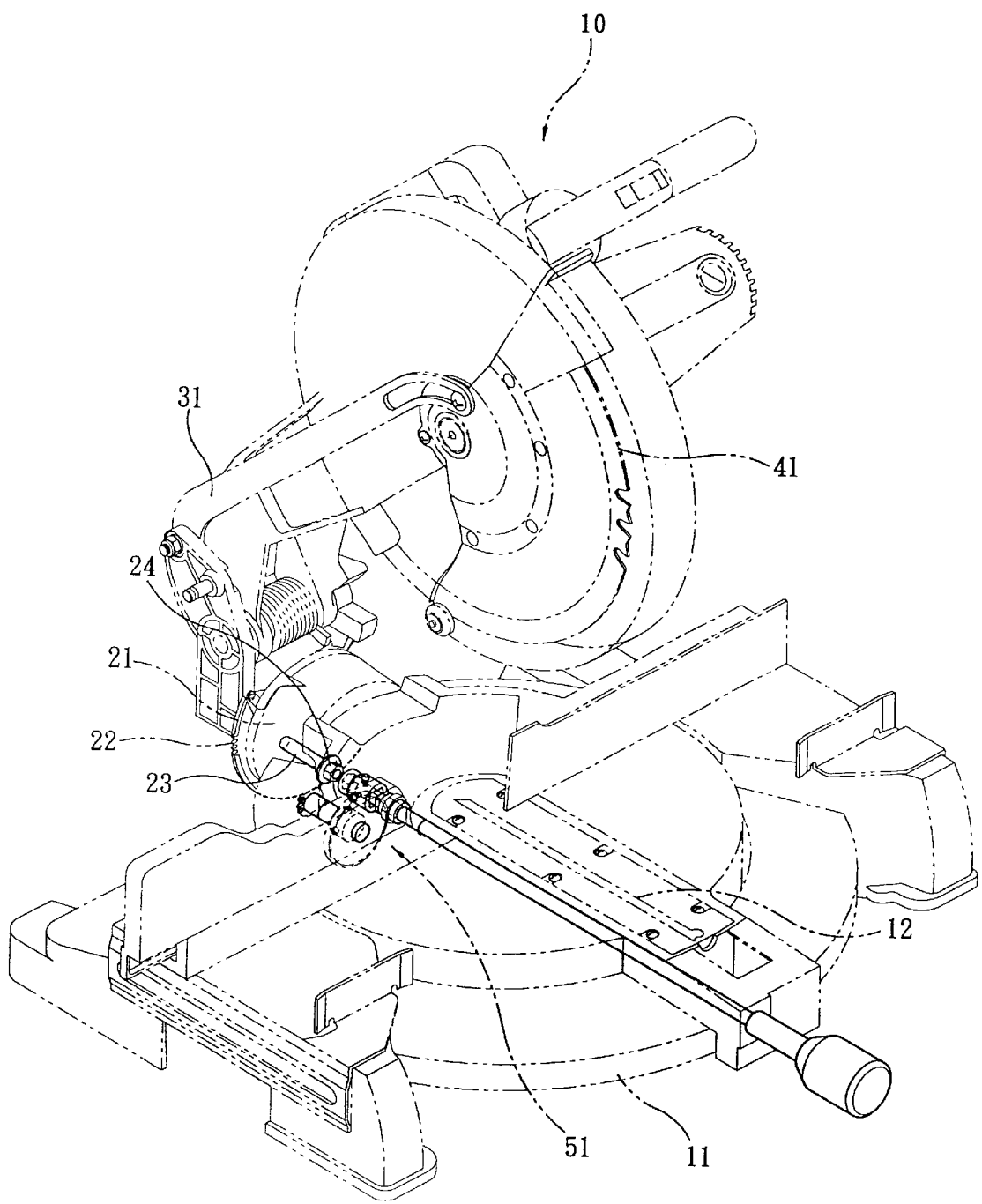
FIG. 1 is a perspective view of a circular saw having a saw arm angle adjusting device in accordance with a preferred embodiment of the present invention.
Figure 2:
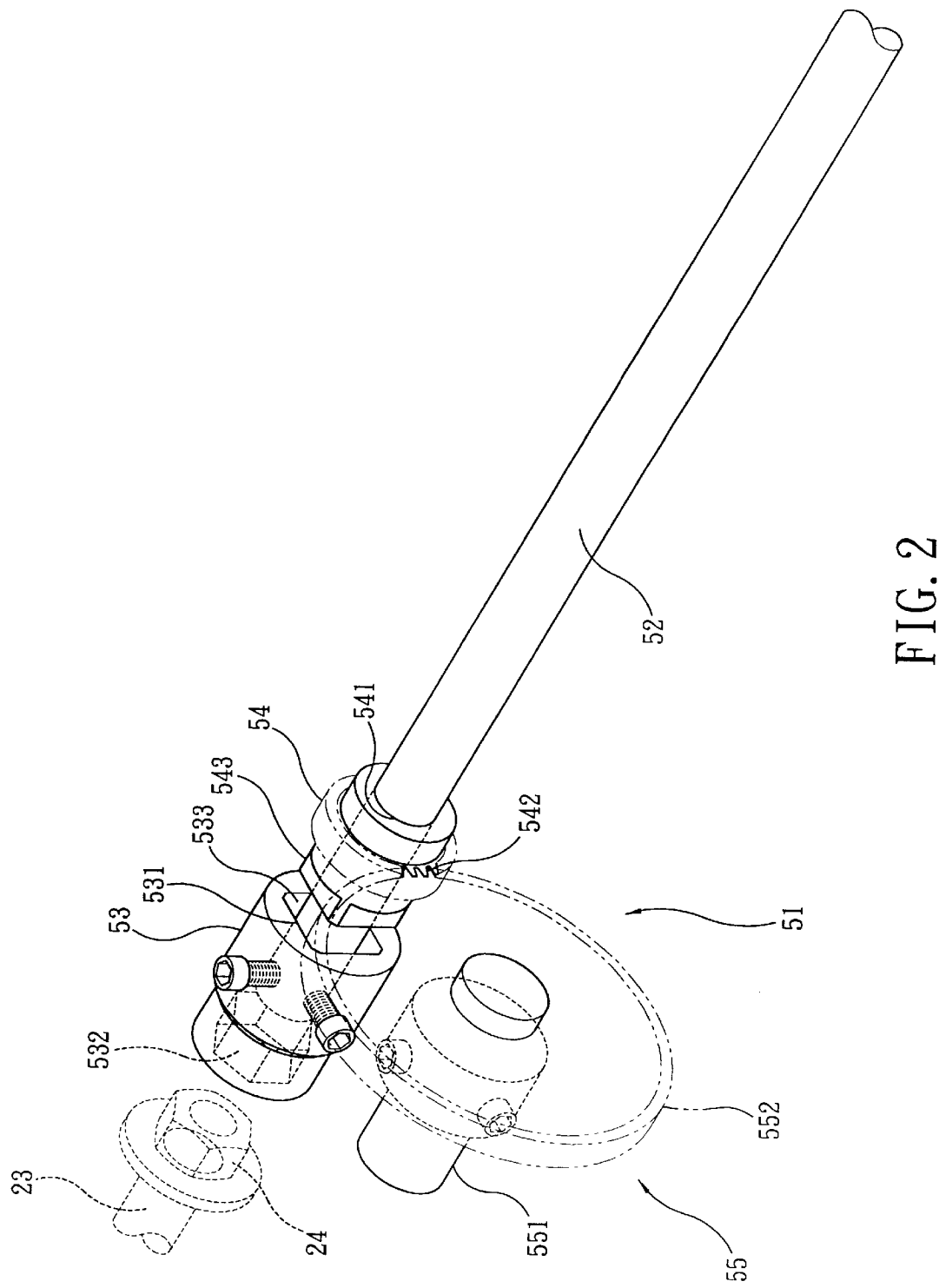
FIG. 2 is an exploded perspective assembly view of an adjusting device of the circular saw having a saw arm angle adjusting device in accordance with the preferred embodiment of the present invention.
Figure 3:
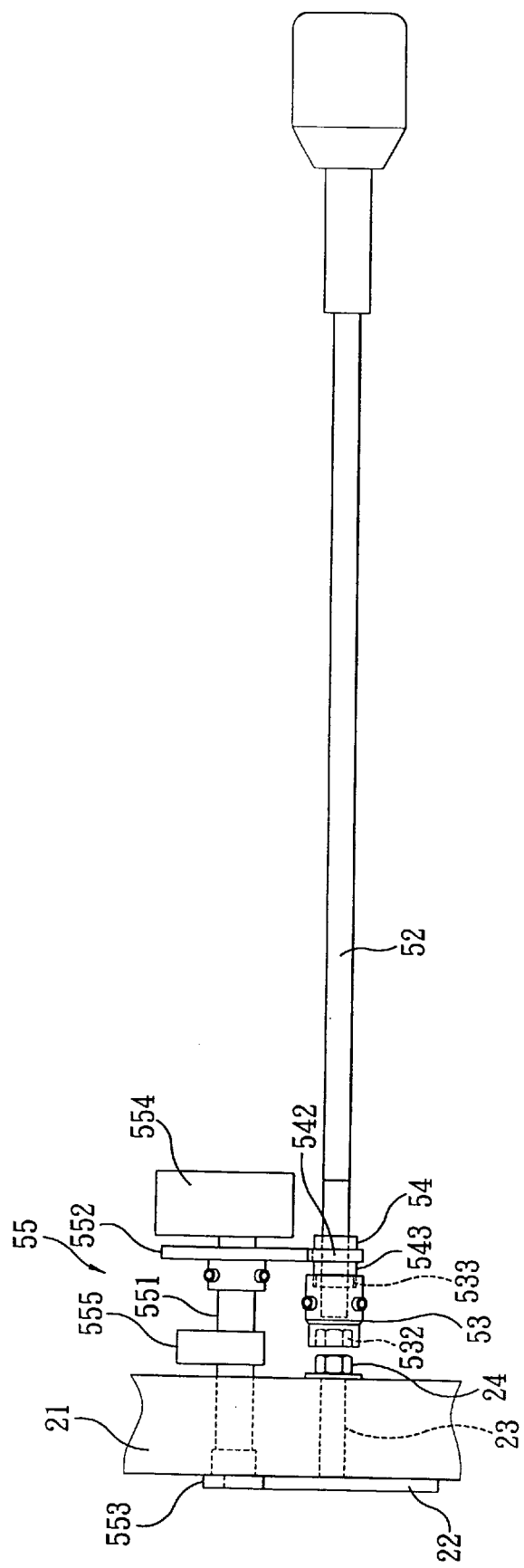
FIG. 3 is a side plan view of the adjusting device of the circular saw having a saw arm angle adjusting device as shown in FIG. 2.

Referring to the drawings and initially to FIGS. 1–3, a circular saw having a saw arm angle adjusting device in accordance with a preferred embodiment of the present invention comprises a base 11, a rotation shaft 21, a saw arm 31, a saw blade 41, and an adjusting device 51 for adjusting the angle of the saw arm 31.

The base 11 may be made with a disk shape, and has a center formed with a cutting slot 12.

The rotation shaft 21 is rotatably mounted on an outer edge of the base 11, and may be rotated relative to the base 11. The rotation shaft 21 has a distal end provided with a gear portion 22. A fixing bolt 23 is extended through the rotation shaft 21, and has one end which is extended into a bottom face of the base 11 and is provided with a hexagonal fixing nut 24 for fixing the rotation shaft 21 to prevent rotation of the rotation shaft 21.

The saw arm 31 has a first end pivotally mounted on the distal end of the rotation shaft 21, so that the saw arm 31 may swing.

The saw blade 41 is rotatably mounted on a raised second end of the saw arm 31, and may be rotated successively by input of an electric power. When the saw arm 31 is pressed to move toward the base 11, the saw blade 41 may be inserted into the cutting slot 12 of the base 11.

The adjusting device 51 is mounted on the bottom face of the base 11, and includes a drive shaft 52, a drive unit 53, a driven unit 54, and an adjusting unit 55.

The drive shaft 52 is an elongated rod, and has a first end extended into the bottom face of the base 11, and a second end exposed outward from the bottom face of the base 11. The drive shaft 52 may be moved axially in a push or pull manner.

The drive unit 53 is secured on the first end of the drive shaft 52 to move therewith. The drive unit 53 has a first side formed with a receiving hole 531 for receiving and securing the first end of the drive shaft 52 by bolts or the like, so that the drive unit 53 may be moved with the drive shaft 52. The receiving hole 531 of the drive unit 53 has a wall formed with a square-shaped first locking recess 533 which has a dimension greater than that of the receiving hole 531. The drive unit 53 has a second side formed with a hexagonal second locking recess 532 that may be used to receive and lock the fixing nut 24 of the fixing bolt 23 when the drive unit 53 is moved to abut the fixing nut 24 of the fixing bolt 23.

The driven unit 54 is rotatably mounted on the bottom face of the base 11. Thus, the driven unit 54 may be rotated and cannot be moved. The driven unit 54 has an inner wall formed with a through hole 541 for passage of the drive shaft 52. The driven unit 54 has one end provided with a square-shaped locking block 543 that may be inserted into the first locking recess 533 of the drive unit 53 when the drive unit 53 is moved to abut the locking block 543 of the driven unit 54. The driven unit 54 has an outer wall provided with a gear portion 542.

The adjusting unit 55 includes a shaft 551 rotatably mounted on the bottom face of the base 11, a first gear 552 secured on a first end of the shaft 551 and meshing with the gear portion 542 of the driven unit 54, and a second gear 553 secured on a second end of the shaft 551 and meshing with the gear portion 22 of the rotation shaft 21. Preferably, the bottom face of the base 11 is provided with two spaced support blocks 554 and 555 for supporting the shaft 551, so that the shaft 551 is rotatably mounted on the bottom face of the base 11. The second end of the shaft 551 is passed through the rotation shaft 21.

Figure 4:
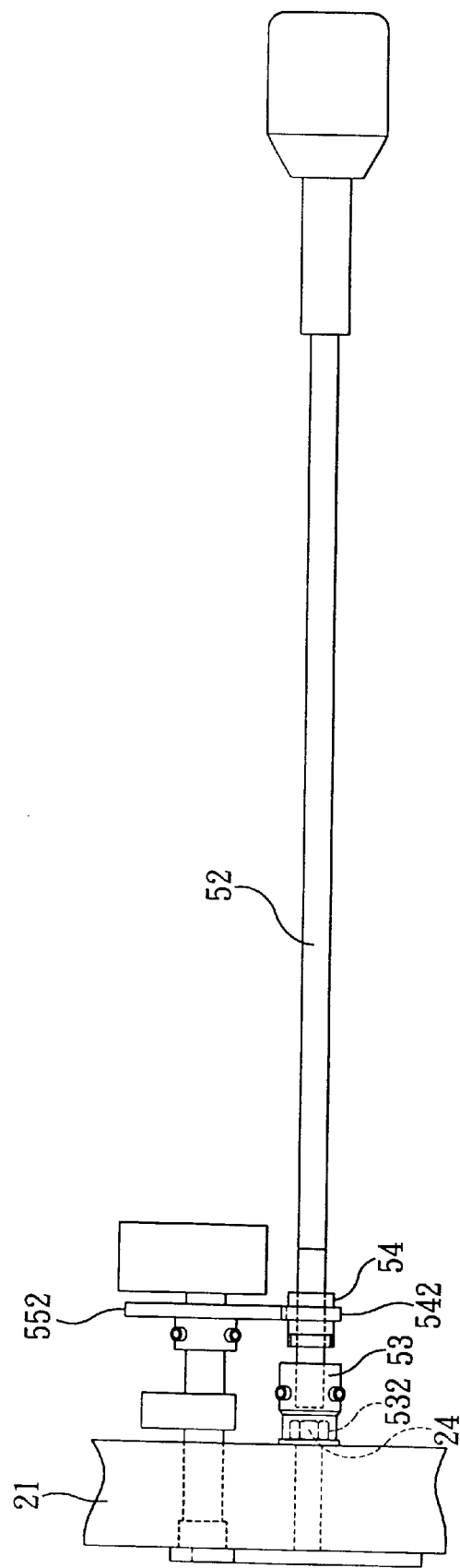
FIG. 4 is a schematic operational view of the adjusting device of the circular saw having a saw arm angle adjusting device as shown in FIG. 3 in use.
Figure 5:
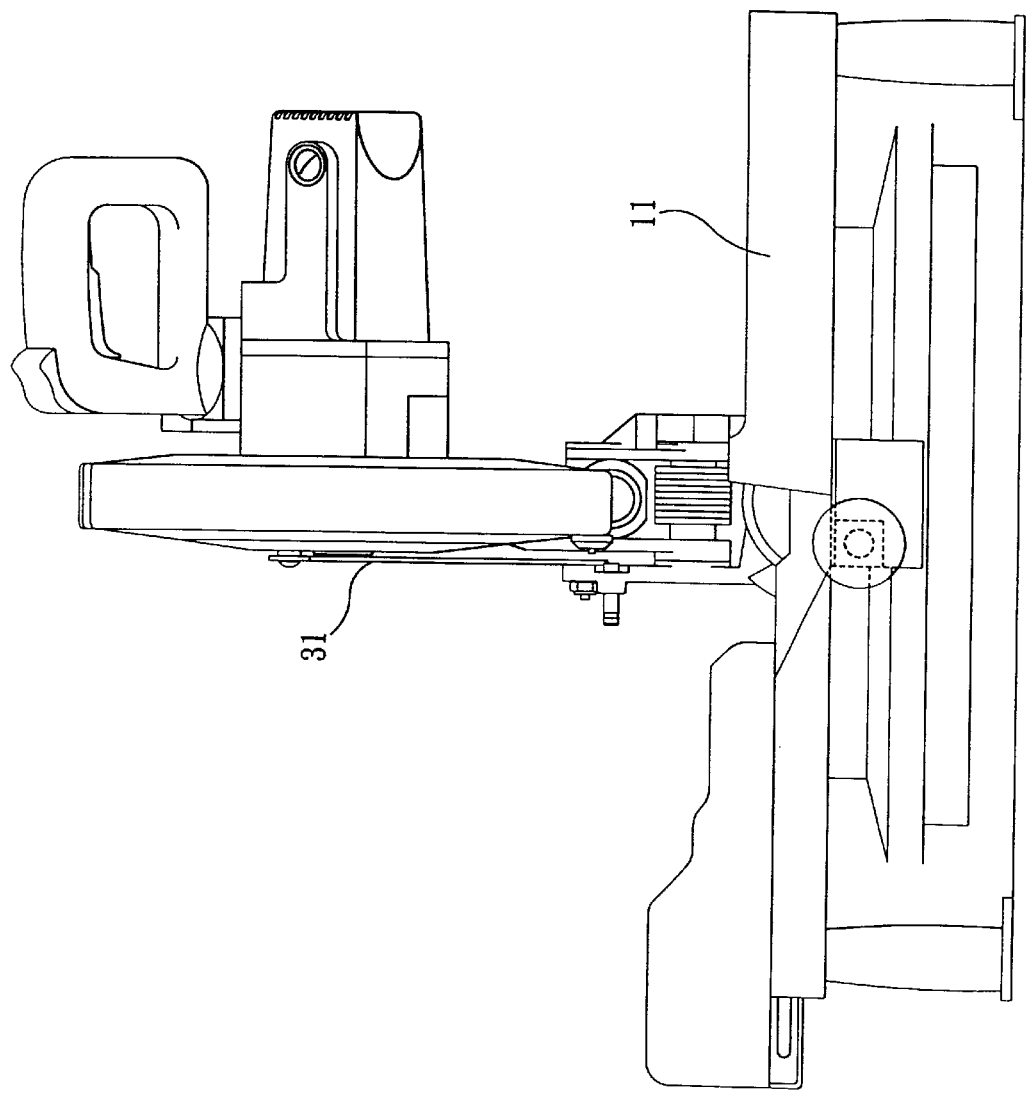
FIG. 5 is a side plan view of the circular saw having a saw arm angle adjusting device as shown in FIG. 1.

In operation, referring to FIGS. 4 and 5, the drive shaft 52 may be pushed into the bottom face of the base 11, and the drive unit 53 may be moved with the drive shaft 52 to move toward the fixing nut 24 of the fixing bolt 23, so that the fixing nut 24 of the fixing bolt 23 may be inserted into and secured in the second locking recess 532 of the drive unit 53.

Then, the drive shaft 52 may be rotated to unscrew the fixing nut 24 of the fixing bolt 23, thereby releasing the rotation shaft 21 from the fixing nut 24 of the fixing bolt 23, so that the rotation shaft 21 may be rotated freely.

It is appreciated that, the drive unit 53 is not combined with the driven unit 54, and the drive shaft 52 is rotatably and movably mounted in the driven unit 54, so that when the drive shaft 52 is rotated, the driven unit 54 is not rotated. Thus, the first gear 552 of the adjusting unit 55 will not be rotated by the gear portion 542 of the driven unit 54.

At this time, the saw arm 31 may be directly pushed and pivoted, to proceed an adjustment action with a larger angle. In addition, the angle of the saw arm 31 may be adjusted in the following manner.

Figure 6:
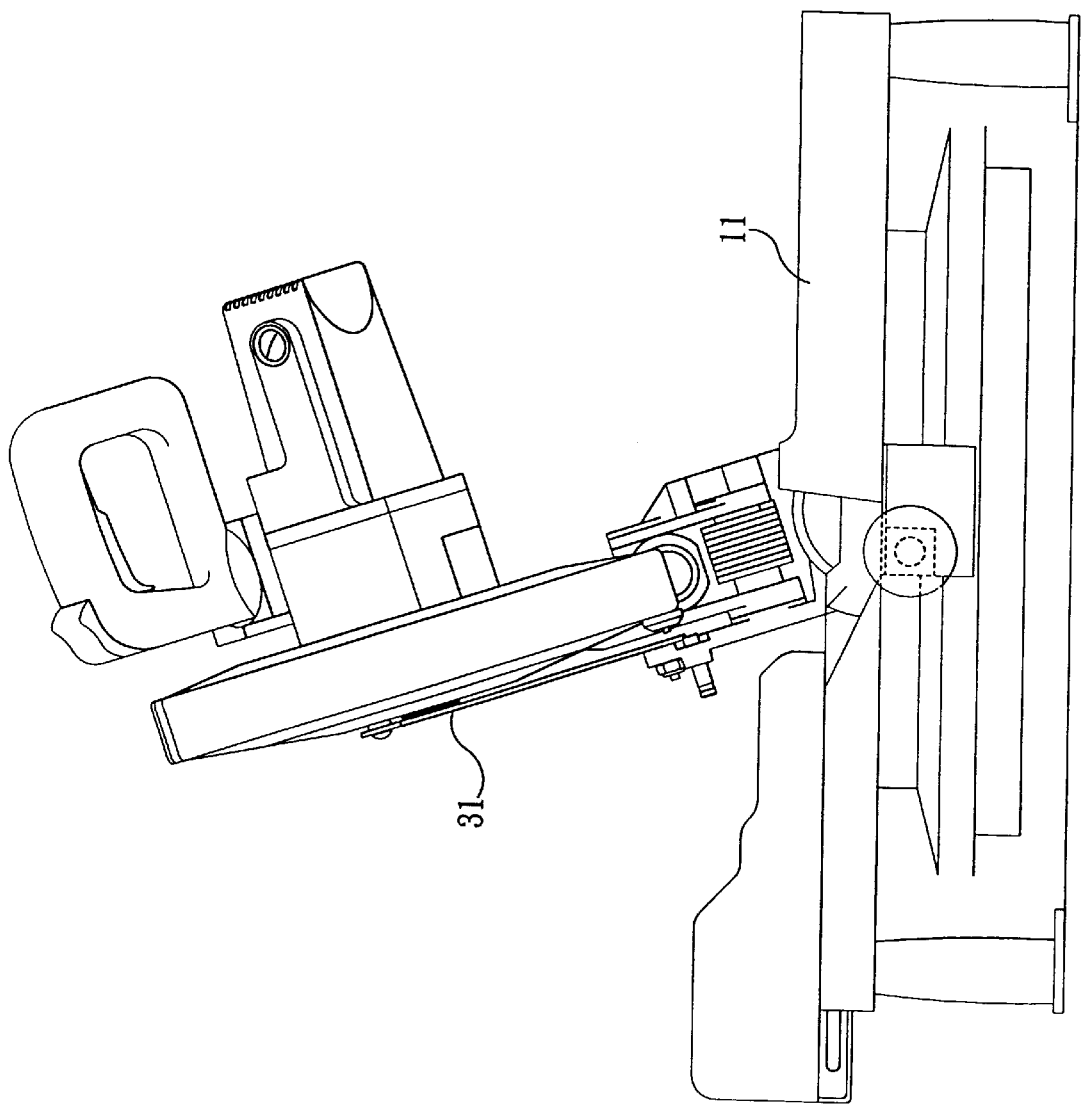
FIG. 6 is a schematic operational view of the circular saw having a saw arm angle adjusting device as shown in FIG. 6 in use.

Referring to FIGS. 3 and 6, the drive shaft 52 may be pulled outward from the bottom face of the base 11, and the drive unit 53 may be moved with the drive shaft 52 to move toward the driven unit 54, so that the locking block 543 of the driven unit 54 may be inserted into and secured in the first locking recess 533 of the drive unit 53. Thus, the drive unit 53 may be combined with the driven unit 54, so that when the drive shaft 52 is rotated, the drive unit 53 may also be rotated with the drive shaft 52 to rotate the driven unit 54 which rotates the gear portion 542 which rotates the first gear 552 of the adjusting unit 55, so as to rotate the shaft 551 which rotates the second gear 553 of the adjusting unit 55, so as to rotate the gear portion 22 of the rotation shaft 21, so that the rotation shaft 21 may be pivoted through a determined angle. Thus, the pivot arm 31 may be pivoted by rotation of the rotation shaft 21 to move from the position as shown in FIG. 5 to the position as shown in FIG. 6, so as to micro-adjust the angle of the saw arm 31 relative to the base 11.

After the angle of the saw arm 31 relative to the base 11 is adjusted, the drive shaft 52 may be pushed into the bottom face of the base 11 again, and the drive unit 53 may be moved with the drive shaft 52 to move toward the fixing nut 24 of the fixing bolt 23, so that the fixing nut 24 of the fixing bolt 23 may be inserted into and secured in the second locking recess 532 of the drive unit 53. Then, the drive shaft 52 may be rotated to screw the fixing nut 24 of the fixing bolt 23, thereby fixing the rotation shaft 21 by the fixing nut 24 of the fixing bolt 23, so that the rotation shaft 21 cannot be rotated freely.

Accordingly, the second end of the drive shaft 52 is exposed outward from the bottom face of the base 11 to face the user, so that the user may directly operate the drive shaft 52 without having to move, so as to operate the adjusting device 51 for adjusting the angle of the saw arm 3 relative to the base 11 so that the user may adjust the angle of the saw arm 31 easily and conveniently.

In addition, the gear portion 542 of the driven unit 54 having a smaller tooth number may be used to drive the first gear 552 of the adjusting unit 55 having a greater tooth number, and the second gear 553 of the adjusting unit 55 having a smaller tooth number may be used to drive the gear portion 22 of the rotation shaft 21 having a greater tooth number, thereby saving manual energy, and thereby capable of micro-adjusting the angle of the saw arm 31 relative to the base 11.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A circular saw having a saw arm angle adjusting device, comprising a base, a saw arm, a rotation shaft mounted between the base and the saw arm, and an adjusting device mounted on the base for adjusting the angle of the saw arm, so that the saw arm may be pivoted through an angle, and may be positioned, wherein:

the rotation shaft is provided with a gear portion, and a fixing bolt is extended through the rotation shaft, and has one end provided with a fixing nut for fixing the rotation shaft to prevent rotation of the rotation shaft; and the adjusting device includes:

a drive shaft, movable axially;

a drive unit, secured on one end of the drive shaft to move therewith, and having a first side formed with a first locking recess, and a second side formed with a second locking recess, for receiving and locking the fixing nut of the fixing bolt when the drive unit is moved to abut the fixing nut of the fixing bolt;

a driven unit, rotatably mounted on the base, the driven unit having one end provided with a locking block that may be inserted into the first locking recess of the drive unit when the drive unit is moved to abut the locking block of the driven unit, the driven unit having an outer wall provided with a gear portion; and an adjusting unit, including a shaft rotatably mounted on the base, a first gear secured on a first end of the shaft and meshing with the gear portion of the driven unit, and a second gear secured on a second end of the shaft and meshing with the gear portion of the rotation shaft.

2. The circular saw having a saw arm angle adjusting device in accordance with claim 1, wherein the gear portion of the driven unit has a tooth number smaller than that of the first gear of the adjusting unit.

3. The circular saw having a saw arm angle adjusting device in accordance with claim 1, wherein the second gear of the adjusting unit has a tooth number smaller than that of the gear portion of the rotation shaft.

4. The circular saw having a saw arm angle adjusting device in accordance with claim 1, wherein the first side of the drive unit is formed with a receiving hole for receiving and securing the drive shaft, so that the drive unit may be moved with the drive shaft.

5. The circular saw having a saw arm angle adjusting device in accordance with claim 1, wherein the driven unit has an inner wall formed with a through hole for passage of the drive shaft.

* * * * *